US009643616B2

(12) United States Patent
Lu

(10) Patent No.: US 9,643,616 B2
(45) Date of Patent: May 9, 2017

(54) SYSTEMS AND METHODS FOR PROVIDING PREDICTIVE VEHICLE DYNAMICS

(71) Applicant: Toyota Motor Engineering & Manufacturing North America, Inc., Erlanger, KY (US)

(72) Inventor: Norman N. Lu, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 66 days.

(21) Appl. No.: 14/458,340

(22) Filed: Aug. 13, 2014

(65) Prior Publication Data

US 2016/0046170 A1    Feb. 18, 2016

(51) Int. Cl.

| | |
|---|---|
| *B60W 40/06* | (2012.01) |
| *B60T 8/1755* | (2006.01) |
| *B60W 30/045* | (2012.01) |
| *B60W 50/00* | (2006.01) |
| *B60W 40/076* | (2012.01) |
| *B60W 40/072* | (2012.01) |
| *B60T 7/12* | (2006.01) |
| *B62D 5/04* | (2006.01) |
| *B60W 30/18* | (2012.01) |
| *B60W 10/18* | (2012.01) |
| *B60W 10/22* | (2006.01) |

(Continued)

(52) U.S. Cl.
CPC ............... *B60W 40/06* (2013.01); *B60T 7/12* (2013.01); *B60T 8/17551* (2013.01); *B60W 30/045* (2013.01); *B60W 40/072* (2013.01); *B60W 40/076* (2013.01); *B60W 50/0097* (2013.01); *B60T 7/22* (2013.01); *B60T 2201/022* (2013.01); *B60T 2260/04* (2013.01); *B60T 2260/06* (2013.01); *B60W 10/18* (2013.01); *B60W 10/22* (2013.01); *B60W 10/30* (2013.01); *B60W 30/02* (2013.01); *B60W 30/18181* (2013.01); *B60W 2550/14* (2013.01); *B60W 2550/142* (2013.01); *B60W 2550/146* (2013.01); *B62D 5/0457* (2013.01)

(58) Field of Classification Search
CPC .. B60W 40/06; B60W 40/072; B60W 40/076; B60W 30/02; B60W 30/045; B60W 50/0097; B60W 2550/14; B60W 2550/142; B60W 2550/146; B60T 7/12; B60T 8/17551
See application file for complete search history.

(56) References Cited

U.S. PATENT DOCUMENTS

| | | | | |
|---|---|---|---|---|
| 5,832,400 A | * | 11/1998 | Takahashi | B60W 10/04 701/65 |
| 6,070,118 A | * | 5/2000 | Ohta | F16H 61/0213 701/65 |

(Continued)

*Primary Examiner* — Dale W Hilgendorf
(74) *Attorney, Agent, or Firm* — Dinsmore & Shohl LLP

(57) ABSTRACT

Systems and methods for providing predictive vehicle dynamics are described herein. Accordingly, embodiments of a method may include predicting a route of a vehicle, determining a route feature along the route, and determining a user-desired speed for traversing the route. Some embodiments may include determining an adjustment to a vehicle performance characteristic to be made in anticipation of the route feature at the user-desired speed and implementing the adjustment on a vehicle system of the vehicle.

20 Claims, 3 Drawing Sheets

(51) Int. Cl.
   *B60W 10/30* (2006.01)
   *B60W 30/02* (2012.01)
   *B60T 7/22* (2006.01)

(56) References Cited

U.S. PATENT DOCUMENTS

| | | | |
|---|---|---|---|
| 6,278,928 B1* | 8/2001 | Aruga | F16H 61/0213 |
| | | | 701/65 |
| 6,763,292 B1 | 7/2004 | Smith et al. | |
| 7,389,172 B2* | 6/2008 | Sugano | B60W 30/16 |
| | | | 701/93 |
| 7,444,241 B2 | 10/2008 | Grimm | |
| 7,825,849 B2 | 11/2010 | Tsuchida et al. | |
| 8,095,290 B2* | 1/2012 | Smyth | B60W 30/188 |
| | | | 701/25 |
| 8,139,109 B2 | 3/2012 | Schmiedel et al. | |
| 8,155,843 B2* | 4/2012 | Takeda | B60W 50/04 |
| | | | 701/48 |
| 8,214,122 B2* | 7/2012 | Krupadanam | B60W 10/06 |
| | | | 701/93 |
| 8,392,064 B2 | 3/2013 | Thrun et al. | |
| 8,655,537 B2 | 2/2014 | Ferguson et al. | |
| 2004/0068359 A1* | 4/2004 | Neiss | B60K 31/0058 |
| | | | 701/93 |
| 2007/0261648 A1* | 11/2007 | Reckels | F01P 7/167 |
| | | | 701/36 |
| 2009/0187322 A1* | 7/2009 | Yasui | B60W 10/06 |
| | | | 701/70 |
| 2010/0030447 A1* | 2/2010 | Smyth | B60W 10/06 |
| | | | 701/22 |
| 2010/0114445 A1* | 5/2010 | Groult | B60W 40/105 |
| | | | 701/70 |
| 2010/0299054 A1* | 11/2010 | Hennequet | B60W 40/02 |
| | | | 701/123 |
| 2011/0264317 A1* | 10/2011 | Druenert | B60W 10/06 |
| | | | 701/22 |
| 2012/0290149 A1* | 11/2012 | Kristinsson | B60W 10/06 |
| | | | 701/22 |
| 2014/0244130 A1* | 8/2014 | Filev | B60W 50/0097 |
| | | | 701/93 |

* cited by examiner

SYSTEMS AND METHODS FOR PROVIDING PREDICTIVE VEHICLE DYNAMICS

TECHNICAL FIELD

Embodiments described herein generally relate to systems and methods for providing predictive vehicle dynamics and, more specifically, to embodiments for altering a function of a vehicle in anticipation of a route feature.

BACKGROUND

There is a desire to design vehicles that increase driver control over different driving conditions. As an example, there is a desire to increase vehicle control around sharp turns, such as at predetermined speeds. As the conditions of the road, weather, visibility, and vehicle change, there is a desire to increase this driver control over the changing conditions that the vehicle and driver may experience. Current vehicle systems do not provide such capability. Thus a need exists in the industry to address these deficiencies.

SUMMARY

Systems and methods for providing predictive vehicle dynamics. One embodiment of a method includes predicting a route of a vehicle, determining a route feature along the route, and determining a user-desired speed for traversing the route. Some embodiments may include determining an adjustment to a vehicle performance characteristic to be made in anticipation of the route feature at the user-desired speed and implementing the adjustment on a vehicle system of the vehicle.

In another embodiment, a system for providing predictive vehicle dynamics includes a vehicle sensor, a plurality of vehicle systems, a processor that is coupled to the vehicle sensor and the plurality of vehicle systems and a memory component that is coupled to the processor. The memory component may include logic that when executed by the processor, causes the system to determine a route of a vehicle and determine a route feature along the route. In some embodiments, the logic causes the processor to determine an adjustment to at least one of the plurality of vehicle systems to accommodate for the route feature and adjust the at least one of the plurality of vehicle systems.

In yet another embodiment, a vehicle includes a vehicle sensor, a vehicle system, and a vehicle computing device that includes a memory component that includes logic that, when executed by a processor, causes the vehicle computing device to determine a route feature along a route of the vehicle, determine a user driving preference of the vehicle along at least a portion of the route, and determine an adjustment to the vehicle system to accommodate for the route feature and the user driving preference. In some embodiments, the logic causes the vehicle computing device to adjust the vehicle system, determine that the vehicle has passed the route feature and return the vehicle system to a normal driving condition mode.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
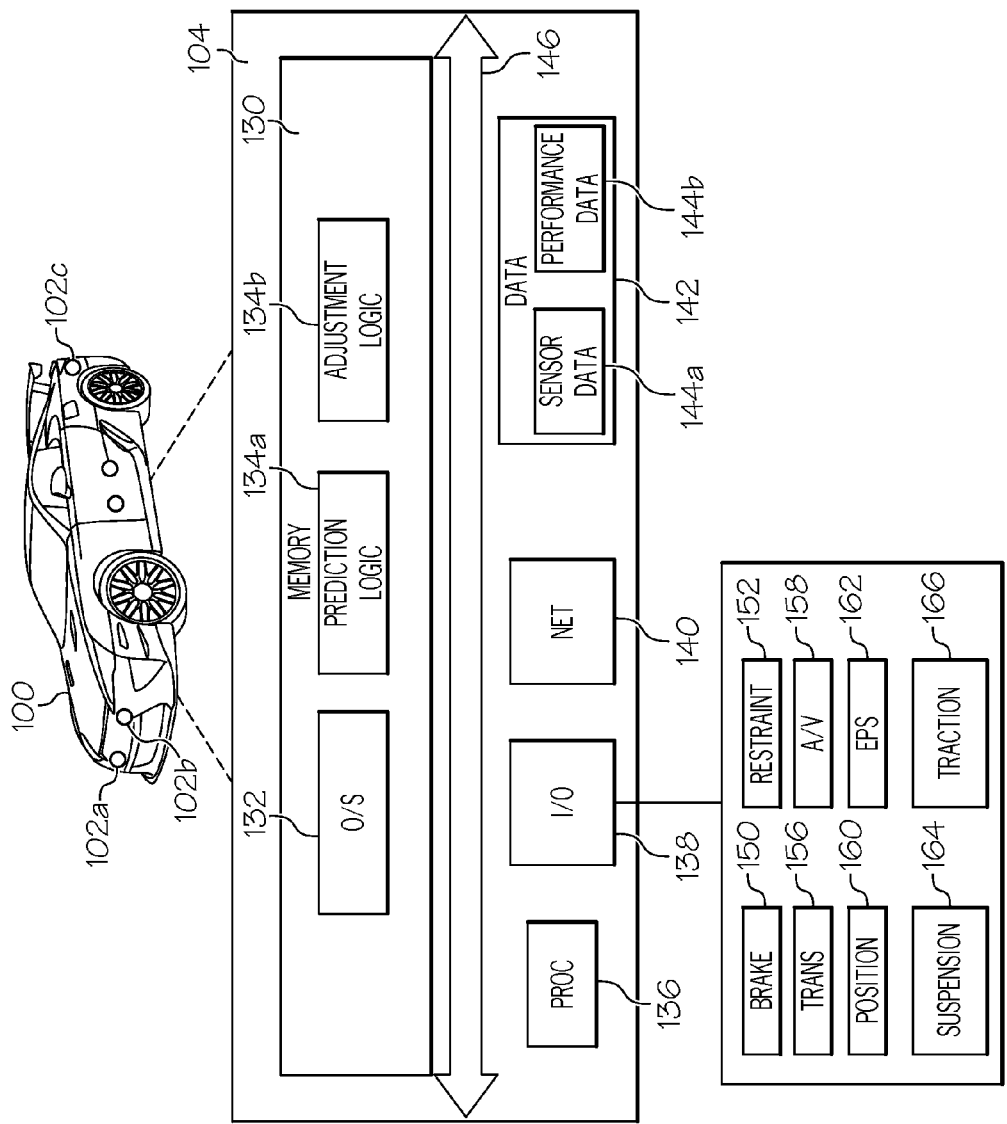
FIG. 1 schematically depicts a vehicle that may provide predictive vehicle dynamics, according to embodiments disclosed herein.

Embodiments disclosed herein include systems and methods for providing predictive vehicle dynamics. Accordingly, some embodiments are configured to predict the vehicle dynamic performance needs and adjust suspension, steering, brake systems, and/or the like prior to encountering the predicted route feature, such as a road condition or vehicle condition. As an example, embodiments may include millimeter-wave radar (or other detection device) to detect objects in front of the vehicle. The vehicle may additionally preload the vehicle brake system, restraint system, and/or other systems, depending on the particular conditions.

Similarly, some embodiments may utilize an image capture device (such as front-view camera, side view camera, rear view camera, etc.), a laser sensor, a millimeter-wave radar, a positioning system, adjustable shock absorbers, adjustable stabilizer bar, electric power steering, braking system, vehicle speed, and/or other vehicle components to predict the vehicle dynamic needs and upcoming road conditions (such as a sharp turn).

In some embodiments, the vehicle may utilize a positioning system and/or a speed sensor to judge upcoming road features and determine whether the suspension, steering, and/or brake adjustments are desired to fully utilize vehicle performance. As an example, the positioning system (such as a global positioning system) may detect an upcoming sharp corner along the route and current vehicle speed. The vehicle computing device may cause the brake system to pre-load in anticipation of vehicle braking to adjust the speed around the turn to a predetermined user-desired speed. The suspension may switch to high damping and high stabilizer stiffness. The steering system may switch to quick ratio.

In addition, the front-view camera and/or millimeter wave radar may detect object and road surface features. The vehicle computing device may additionally provide the driver with instructions, and/or may similarly alter the vehicle performance components to better handle these conditions.

Some embodiments may include hardware prerequisites, such as shock absorbers with adjustable damping force and electric power steering systems with adjustable assist levels. Accordingly, the vehicle computing device may differentiate drivers based on key fob, user input, and/or other criteria. The vehicle computing device may track and learn driving patterns of the driver based on steering angle, steering speed, vehicle speed, yaw rate, lateral acceleration, longitudinal acceleration, etc. to predict driver intent, such as a driver-desired speed. The driver intent may then be categorized, such as relaxed highway cruising, sporty driving, aggressive driving, etc. The vehicle computing device may then select the desired parameters for shock absorbers, power steering, etc., to account for the driver's intended driving pattern and the predicted route condition. Accordingly, embodiments may be configured to determine route features and the driver's intended driving pattern to make vehicle adjustments.

Referring now to the drawings, FIG. 1 schematically depicts a vehicle 100 that may provide predictive vehicle dynamics, according to embodiments disclosed herein. As illustrated, the vehicle 100 may include a plurality of vehicle sensors 102a, 102b, 102c (collectively "vehicle sensors 102"). The vehicle sensors 102 may include proximity sensors (including laser, infrared, camera, etc.), tire pressure sensors, engine sensors, oil sensors, on-board cameras, fuel sensors, speed sensors, millimeter-wave radar, and/or other sensors, as described herein to send a signal identifying a condition of the vehicle 100. Also included is a computing device, such as the vehicle computing device 104, which may be utilized to determine changes to the vehicle 100 and send commands to one or more of the vehicle components, as described herein.

The vehicle computing device 104 may include a memory component 130, a processor 136, input/output hardware 138, network interface hardware 140, and a data storage component 142 (which stores sensor data 144a, performance data 144b, and/or other data). The memory component 130 may be configured as volatile and/or nonvolatile memory. As such, the memory component 130 may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle computing device 104 and/or external to the vehicle computing device 104.

The memory component 130 may store operating logic 132, prediction logic 134a, and adjustment logic 134b. The prediction logic 134a and the adjustment logic 134b may each include a plurality of different pieces of logic, each of which may be embodied as a computer program, firmware, and/or hardware, as an example. A communications path 146 is also included in FIG. 1 and may be implemented as a bus or other communication interface to facilitate communication among the components of the vehicle computing device 104.

The processor 136 may include any processing component operable to receive and execute instructions (such as from a data storage component 142 and/or the memory component 130). As described above, the input/output hardware 138 may include and/or be configured to interface with external components, such as a braking system 150, a restraint system 152 (which may include seatbelts, airbags, etc.), a transmission system 156, an audio/video system 158, a positioning system 160, an electronic power steering (EPS) system 162, a suspension system 164, and a traction control system 166. One or a plurality of other vehicle systems that may be utilized for operating the vehicle 100 may also be included in this description.

The network interface hardware 140 may include and/or be configured for communicating with any wired or wireless networking hardware, including an antenna, a modem, a LAN port, wireless fidelity (WI-FI) card, WIMAX card, mobile communications hardware, and/or other hardware for communicating with other networks and/or devices. From this connection, communication may be facilitated between the vehicle computing device 104 and other computing devices.

The operating logic 132 may include an operating system and/or other software for managing components of the vehicle computing device 104. As discussed above, the prediction logic 134a may reside in the memory component 130 and may be configured to cause the processor 136 to receive one or more signals from at least one vehicle sensor 102 and predict an upcoming road condition and/or vehicle condition. Similarly, the adjustment logic 134b may be utilized to determine a vehicle adjustment for maintaining and/or increasing vehicle performance in light of the anticipated condition.

It should be understood that while the components in FIG. 1 are illustrated as residing within and/or connected to the vehicle computing device 104, this is merely an example. In some embodiments, one or more of the components may reside external to the vehicle computing device 104. It should also be understood that, while the vehicle computing device 104 is illustrated as a single device, this is also merely an example. In some embodiments, the components depicted therein may reside on different computing devices.

Additionally, while the vehicle computing device 104 is illustrated with the prediction logic 134a and the adjustment logic 134b as separate logical components, this is also an example. In some embodiments, a single piece of logic may cause the vehicle computing device 104 to provide the described functionality.

Figure 2:
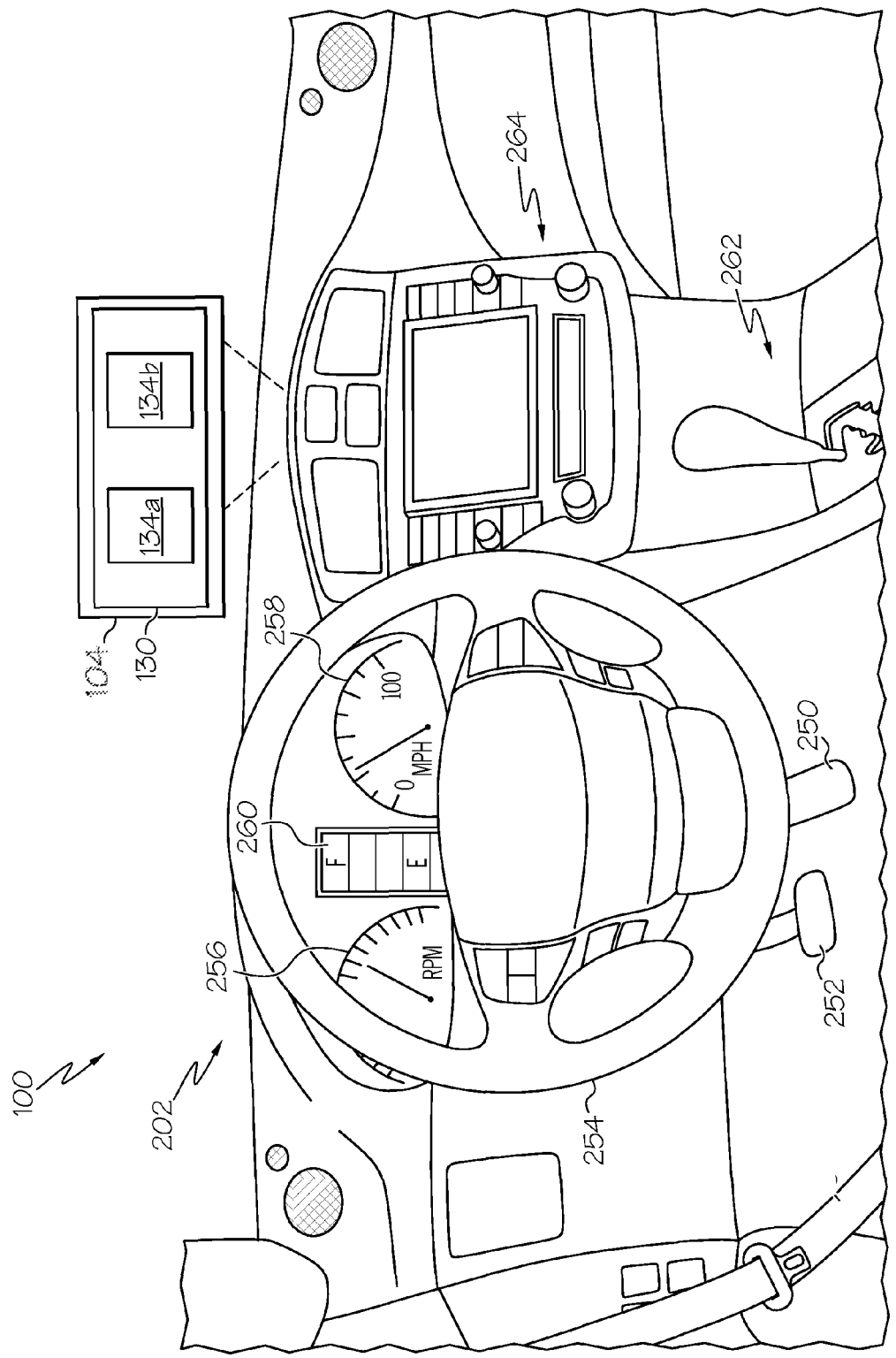
FIG. 2 schematically depicts an interior of a vehicle that may provide predictive vehicle dynamics, according to embodiments disclosed herein.

FIG. 2 schematically depicts a vehicle interior 202 that may provide predictive vehicle dynamics, according to embodiments disclosed herein. As illustrated, the vehicle 100 may include the vehicle computing device 104 and the memory component 130, with the prediction logic 134a, and the adjustment logic 134b. The vehicle interior 202 includes a gas pedal 250, which may be part of the traction control system 166 (FIG. 1) and/or other vehicle system, such as an engine performance system. The vehicle interior 202 may also include a brake pedal 252, which may be part of the braking system 150 (FIG. 1) and/or other vehicle system. Similarly, a steering wheel 254 may also be included and may be part of the EPS system 162 (FIG. 1). The vehicle interior may also include a speedometer 258, an RPM gauge 256, and a fuel gauge 260, which may also be part of one or more of the systems from FIG. 1 and/or other vehicle systems. A gear shift 262 may also be included and may be part of the transmission system 156 and/or other vehicle systems. An in-dash entertainment system 264 may include a disc player, a radio antenna, one or more video displays, one or more speakers, etc. and may also be included as part of an audio/video system 158 (FIG. 1). One or more components of the audio/video system 158 may be utilized as part of the positioning system 160 (FIG. 1).

Accordingly, embodiments disclosed herein may be configured to anticipate or predict an upcoming road condition and adjust a vehicle performance characteristic of one or more of the vehicle systems to accommodate for that vehicle condition. As an example, the vehicle 100 may be traversing a route that is being tracked by the positioning system 160. The route may be determined, based on a user inputting a predetermined destination and/or via logic on the vehicle 100 that anticipates a likely destination and predicts the route to the likely destination. Regardless, the vehicle computing device 104 may determine that the predicted route includes a sharp turn. The vehicle computing device 104 may additionally determine external data, such as road conditions, weather data, etc. from vehicle sensors 102, an internet connection and/or other mechanisms. Additionally, the vehicle computing device 104 may determine at least one user driving preference for traversing the route, such as a driver-preferred speed. The vehicle computing device 104 may then determine appropriate adjustments to the vehicle 100 to traverse the route condition. As an example, the vehicle computing device 104 may determine that the road conditions and the route and may indicate that during a particular turn, the vehicle 100 would operate more efficiently if the transmission system 156 changes gears and the traction control system 166 alters the slip differential for better gripping. Accordingly, as the vehicle 100 approaches the turn, the vehicle computing device 104 may send a signal to the respective systems to implement this adjustment. Thus, over the course of the route, the vehicle computing device 104 may identify a plurality of different road conditions that cause adjustments to the vehicle 100.

Some embodiments may be configured to determine a vehicle condition, determine a new route to address the vehicle condition, and/or utilize the new route for addressing the vehicle condition. As another example, the vehicle 100 may determine the route and may identify that the vehicle 100 may run out of fuel if the vehicle 100 does not make an adjustment. In such a scenario, the vehicle computing device 104 may identify the fuel level and may adjust vehicle performance to favor fuel economy, instead of engine performance. Accordingly, the vehicle 100 may increase fuel mileage and may additionally inform the user of the changes. The vehicle computing device 104 may also provide a location of a refueling station.

Similarly, vehicle maintenance may be identified as the vehicle condition, such as for flat tires, engine issues, etc. The vehicle computing device 104 may cause the vehicle 100 to make the appropriate adjustments and/or route the vehicle 100 to the appropriate location for addressing the vehicle condition.

In some embodiments, the vehicle 100 may encounter a road condition (or vehicle condition) that did not exist when the vehicle 100 began traversing the route and/or otherwise developed during the trip. Such a road condition may include an accident, a stopped vehicle in the route, an animal, etc. While in the previous examples, the vehicle computing device 104 may identify the road conditions and/or vehicle conditions prior to beginning the trip, in this example, the vehicle computing device 104 may react to the changing conditions and may thus make adjustments to the vehicle 100 accordingly. As an example, the vehicle 100 may utilize one or more of the vehicle sensors 102 to identify that an animal is present on the side of the road. The vehicle computing device 104 may monitor the location of the animal with respect to the vehicle 100 and may send a signal to the restraint system 152 (FIG. 1), the braking system 150 (FIG. 1), and/or other systems for preparing the vehicle 100 in case the animal enters into a path of the vehicle 100. Once the vehicle condition or road condition has passed, the vehicle computing device 104 may send a signal to again adjust the vehicle 100 to normal driving condition mode and/or to prepare for the next road condition and/or vehicle condition.

Similarly, the positioning system 160 and/or vehicle sensors 102 may identify that a different vehicle has stopped in the path of the vehicle 100. In such a scenario, the vehicle computing device 104 may send a command to the braking system 150, the restraint system 152, the audio/video system 158, the EPS system 162 and/or other vehicle systems to prepare for avoiding a collision with the different vehicle. As an example, the audio/video system 158 may provide auditory and/or visual signals to alert the user of the different vehicle. The braking system 150 may load to prepare for a sudden stop. The restraint system 152 may load to prepare for a sudden stop. The EPS system 162 may adjust for quick turning. Other vehicle systems may similarly adjust.

Figure 3:
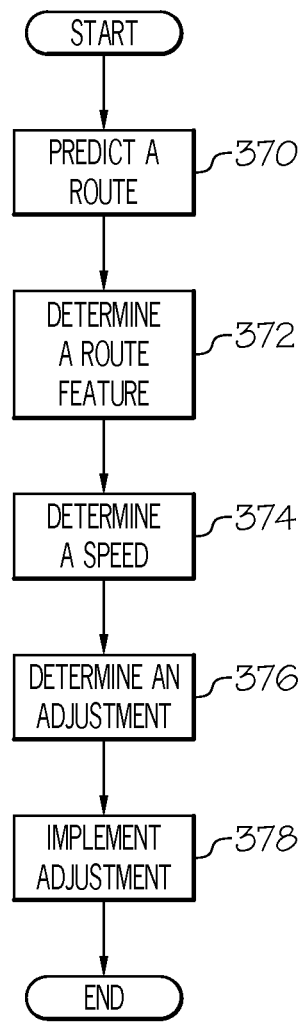
FIG. 3 depicts a flowchart for providing predictive vehicle dynamics, according to embodiments disclosed herein.

FIG. 3 depicts a flowchart for providing predictive vehicle dynamics, according to embodiments disclosed herein. As illustrated in block 370, a route of the vehicle 100 may be predicted. In block 372 a route feature along the route may be determined. In block 374, a user-desired speed for traversing the predicted route may be determined. In block 376, an adjustment to a vehicle performance characteristic may be determined to be made in anticipation of the route feature at the user desired speed. In block 378, the adjustment may be sent to an appropriate vehicle system for implementation.

As illustrated above, various embodiments of providing predictive vehicle dynamics. Accordingly, embodiments described herein may allow a user to obtain optimum vehicle performance, regardless of the road or vehicle conditions. Such embodiments may determine a route and road conditions along that route and make vehicle adjustments prior to encountering those road conditions. Similarly, vehicle conditions may also be determined and adjustments may be made to accommodate for the determined vehicle adjustments. Such adjustments improve vehicle performance, and thus user satisfaction.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for information management. It should also be understood that these embodiments are merely exemplary and are not intended to limit the scope of this disclosure.

What is claimed is:

1. A method for providing predictive vehicle dynamics comprising:
   determining driving patterns of a user;
   predicting, by a computing device, a route of a vehicle;
   determining, by the computing device, a route feature along the route;
   predicting, by the computing device, driver intent for traversing the route feature, wherein predicting driver intent includes determining a user-desired speed for traversing the route and route feature based on previously determined driving patterns of the user;
   determining, by the computing device, an adjustment to a vehicle performance characteristic to be made in anticipation of the route feature at the user-desired speed, wherein the adjustment to the vehicle performance characteristic includes preloading a vehicle system; and
   implementing, by the computing device, the adjustment on the vehicle system of the vehicle.

2. The method of claim 1, wherein the route feature comprises at least one of the following: a road condition and a vehicle condition.

3. The method of claim 1, further comprising:
   determining, by the computing device, that the route feature has been passed by the vehicle; and
   returning, by the computing device, the vehicle to a normal driving condition mode.

4. The method of claim 1, wherein determining the route feature along the route is performed at one of the following: prior to encountering the route feature and after encountering the route feature.

5. The method of claim 1, wherein the user-desired speed is determined from previously determined user driving habits.

6. The method of claim 1, wherein the adjustment to the vehicle performance characteristic comprises adjusting at least one of the following: a braking system, a restraint system, a transmission system, an audio/video system, an electronic power steering (EPS) system, a suspension system, and a traction control system.

7. The method of claim 1 wherein determining the route of the vehicle comprises receiving a signal from at least one of the following: a positioning system and a vehicle sensor.

8. A system for providing predictive vehicle dynamics comprising:
a vehicle sensor;
a plurality of vehicle systems;
a processor that is coupled to the vehicle sensor and the plurality of vehicle systems; and
a memory component that is coupled to the processor, the memory component storing logic that when executed by the processor, causes the system to perform at least the following:
determining driving patterns of a user;
determine a route of a vehicle;
determine a route feature along the route;
predict driver intent for traversing the route feature, wherein predicting driver intent includes determining a user-desired speed for traversing the and route feature based on previously determined driving patterns of the driver;
determine at least one of the plurality of vehicle systems to preload to accommodate for the route feature, such that the vehicle traverses the route feature at the user-desired speed; and
preload the at least one of the plurality of vehicle systems that enables the vehicle to traverse the route feature at the user-desired speed.

9. The system of claim 8, wherein the plurality of vehicle systems comprises a positioning system, wherein the positioning system is utilized to determine the route of the vehicle and wherein the positioning system is utilized to determine the route feature along the route.

10. The system of claim 9, wherein adjusting the at least one of the plurality of vehicle systems includes preloading at least one of the following: a braking system, a restraint system, a transmission system, an electronic power steering (EPS) system, a suspension system, and a traction control system.

11. The system of claim 8, wherein the logic further causes the system to return the vehicle to a normal driving condition mode after the vehicle passes the route feature.

12. The system of claim 8, wherein the route feature comprises at least one of the following: a road condition and a vehicle condition.

13. The system of claim 8, wherein the vehicle sensor comprises at least one of the following: millimeter-wave radar, a laser sensor, and an image capture device.

14. The system of claim 8, wherein the route feature comprises a vehicle condition, wherein the logic further causes the system to determine a new route to address the vehicle condition and utilize the new route for addressing the vehicle condition.

15. A vehicle for providing predictive vehicle dynamics comprising:
a vehicle sensor;
a plurality of vehicle systems; and
a vehicle computing device that includes a memory component that includes logic that, when executed by a processor, causes the vehicle computing device to perform at least the following:
determine driving patterns of a driver, based on past driving by the driver;
determine a route feature along a route of the vehicle;
predict driver intent for traversing the route feature, wherein predicting driver intent includes determining a user-desired speed for traversing the route and route feature based on the driving patterns of the driver;
determine which of the plurality of vehicle systems to preload to accommodate for the route feature at the user-desired speed;
preload the determined vehicle system;
determine that the vehicle has passed the route feature; and
return the vehicle system to a normal driving condition mode.

16. The vehicle of claim 15, wherein the vehicle system comprises a positioning system, wherein the positioning system is utilized to determine the route of the vehicle.

17. The vehicle of claim 16, wherein the vehicle system includes at least one of the following: a braking system, a restraint system, a transmission system, an audio/video system, an electronic power steering (EPS) system, a suspension system, and a traction control system.

18. The vehicle of claim 15, wherein the route feature comprises at least one of the following: a road condition and a vehicle condition.

19. The vehicle of claim 15, wherein the vehicle sensor comprises at least one of the following: millimeter-wave radar, a laser sensor, and an image capture device.

20. The vehicle of claim 15, wherein the route feature comprises a vehicle condition, wherein the logic further causes the vehicle computing device to determine a new route to address the vehicle condition and utilize the new route for addressing the vehicle condition.

* * * * *

UNITED STATES PATENT AND TRADEMARK OFFICE
CERTIFICATE OF CORRECTION

| | | |
|---|---|---|
| PATENT NO. | : 9,643,616 B2 | Page 1 of 1 |
| APPLICATION NO. | : 14/458340 | |
| DATED | : May 9, 2017 | |
| INVENTOR(S) | : Norman N. Lu | |

It is certified that error appears in the above-identified patent and that said Letters Patent is hereby corrected as shown below:

In the Claims

In Column 7, Claim 8, Line 32, after "a user-desired speed for traversing the" insert --route--, therefor.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*